April 2, 1957 W. B. RETZ 2,787,471
CHUCK JAWS
Filed June 24, 1954
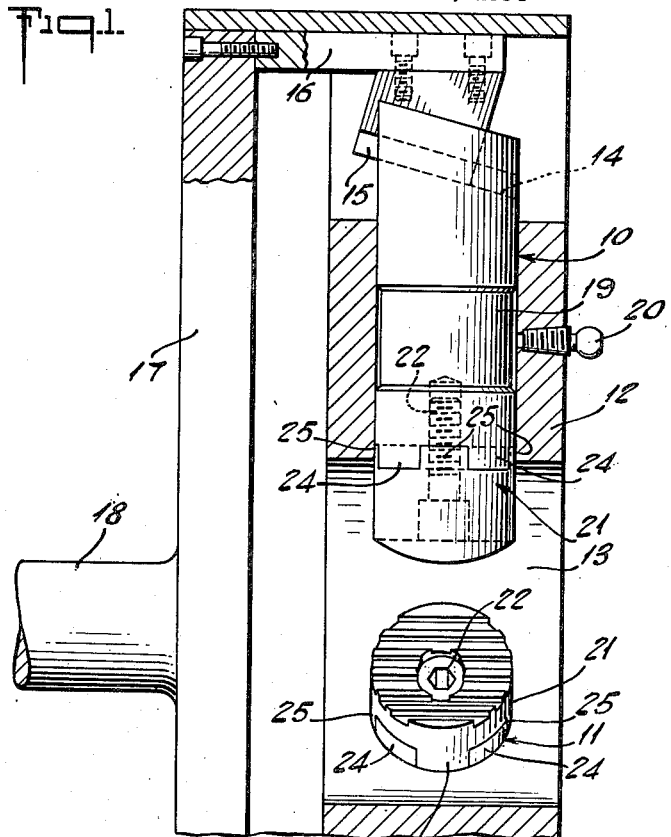
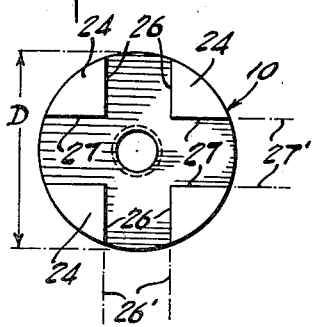
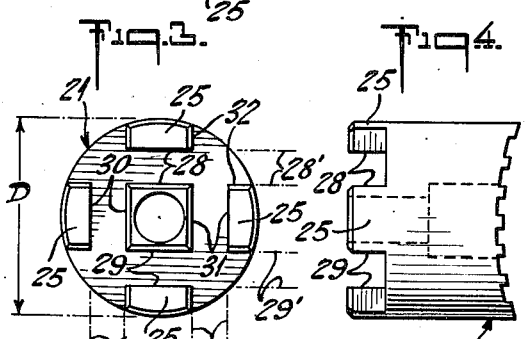
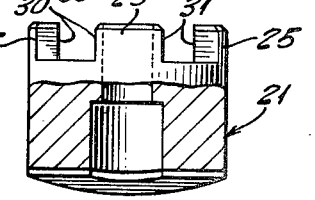
INVENTOR
WILLIAM B. RETZ
BY
Mitchell & Bechert
ATTORNEYS

United States Patent Office 2,787,471
Patented Apr. 2, 1957

2,787,471

CHUCK JAWS

William B. Retz, Plainville, Conn., assignor to The New Britain Machine Company, New Britain, Conn., a corporation of Connecticut Application June 24, 1954, Serial No. 438,980

9 Claims. (Cl. 279—123)

My invention relates to a chucking means and in particular to a combination of false-jaw means with the main chuck jaws.

It is an object of the invention to provide improved means of the character indicated.

Another object is to provide a chuck-jaw and false-jaw construction featuring improved alignment and location of the false jaw on the chuck jaw.

A further object is to provide an improved complex of interlocking projections on a chuck jaw and on a false jaw to be fitted thereto.

A specific object is to meet the above objectives with a construction lending itself to accurate production-machining from tough stock and requiring no casting operations.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a simplified fragmentary longitudinal sectional view of a chuck incorporating features of the invention;

Fig. 2 is an end elevation of a chuck jaw of Fig. 1;

Fig. 3 is an end elevation of a false jaw to fit the chuck jaw of Fig. 2; and

Figs. 4 and 5 are 90°-displaced side elevations of the false jaw of Fig. 3.

Briefly stated, my invention contemplates an improved configuration of interlocking axial projections on a chuck jaw and on a false jaw secured thereto. One of these jaws is formed, on the axial end adjacent the other jaw, with crossed single grooves intersecting on the thrust axis to define a plurality of axial projections. The other jaw is formed, on the axial end adjacent the one jaw, with crossed pairs of spaced parallel grooves intersecting off the thrust axis. The angular inclinations of the grooves in one jaw correspond with those in the other, and the spacing of parallel grooves is related to the width of the single grooves as to define neatly fitting closely interlocking projections.

Referring to Fig. 1 of the drawings, my invention is shown in application to a simplified chuck mechanism comprising a plurality of angularly spaced jaws 10—11, supported for generally radial reciprocation in a body or guide block 12 having a bore in which work is received and into which the jaws project to grip the work. The actuated ends of the jaws may be formed with cam grooves or surfaces, as at 14, to receive and guide an actuating wedge or cam 15 on a longitudinally reciprocable member 16. The engagement at 15—16 may be of the dovetail variety to assure positive inward and outward jaw displacement. Actuating means 17—18 may be common to the individual actuators 15—16 for the various jaws to assure repeatedly uniform chucking action by all jaws.

The jaws 10—11 may be of any desired section, but in the form shown are cylindrical throughout, there being a central reduced portion 19 serving as a manifold for distribution of lubricant admitted at fitting 20. Depending upon the diameter of work to be clamped by the chuck, a selected false jaw from a range of sizes of false jaws 21 may be removably secured to the jaws proper 10—11. Bolt means 22 is shown seated in a counterbore in the work-engaging end of the false jaw 21 and is anchored in each chuck jaw.

In accordance with the invention, I provide novel interlocking axial projections 24—25 on the chuck jaw and on the false jaw to locate the false jaw against any relative angular or lineal displacement. Precise fit and location of the parts is achieved by making all projections in simple milling operations. In the case of one jaw (10), the projections 24 are defined by a plurality of crossed grooves transverse to and intersecting on the thrust axis of the jaws; as shown, two grooves 26—27 of equal depth and width are cut by mutually perpendicular end traverses of the same milling cutter, and in Fig. 2 phantom projections 26'—27' identify the cutter paths for the respective grooves.

In the case of the other jaw (21), the projections 25 are defined by a plurality of crossed pairs of parallel grooves transverse to and intersecting at locations radially offset from the thrust axis of the jaw. The number and relative angular orientation of these crossed pairs of grooves corresponds to the number of grooves 26—27 in the one jaw (10); thus, two pairs of grooves 28—29 and 30—31 of equal depth and width may be cut by mutually perpendicular end traverses of another milling cutter, and in Fig. 3 phantom projections 28'—29' and 30'—31' identify the cutter paths for the respective grooves.

For neatest fit of projections 24—25, the minimum spacing between adjacent walls of the grooves of the respective pairs 28—29 and 30—31 on the said other jaw (21) should be at least substantially the effective width of the correspondingly oriented grooves 26—27 on the said one jaw (10). Also, in order that projections on jaw 21 shall be avoided in the angular space between adjacent projections 25, I prefer (for the two-perpendicular-groove construction shown), that the minimum spacing between outer walls of the grooves of these respective pairs 28—29 and 30—31 shall be at least substantially the jaw diameter D (at location of interfit) times cos 45°. For maximum body strength of the projections 25, the spacing between said outer walls of the groove pairs should be substantially said diameter D times cos 45°, and the width of grooves 26—27 is preferably only sufficiently less than D cos 45° as to present a substantial wall, as at 32, rather than a point or edge, to resist any tendency to rotate with respect to adjacent projections 24.

It will be appreciated that I have described an ingenious chuck-jaw construction whereby simple milling-machine operations may perform precise cuts to determine correspondingly precise installations of selected false jaws. This precision may characterize the fit for a variety of false-jaw sizes, and the same milling-machine set-up may be used to cut all false jaws. To facilitate assembly certain edges of projections 24—25 may be chamfered or bevelled as shown. Also, if desired, the groove cuts of Fig. 2 may be applied to the false jaws 21 while the groove cuts of Fig. 3 are applied to the chuck jaws, but my preference is for the arrangement shown.

Although I have described the invention in detail for the preferred form shown, it will be understood that modifications may be made within the scope of the invention as defined in the claims which follow.

I claim:

1. In combination, a chuck jaw and a false jaw secured thereto on a common thrust axis, one of said jaws having on the axial side adjacent the other jaw a plurality of crossed parallel-walled grooves transverse to and intersecting on said axis and defining a plurality of axial projections on said one jaw, the other jaw having on the axial side facing said one jaw a plurality of crossed pairs of spaced parallel-walled parallel grooves transverse to and intersecting at locations radially offset from said axis and defining a plurality of axial projections on said other jaw and interlocking with the projections on said one jaw.

2. The combination of claim 1, in which the other axial side of said chuck jaw is formed with an actuating cam surface.

3. The combination of claim 1, in which the other axial side of said false jaw is formed with a stock-gripping surface.

4. In combination, a chuck jaw and a false jaw secured thereto on a common thrust axis, one of said jaws having on the axial side adjacent the other jaw two mutually perpendicular crossed parallel-walled grooves transverse to and intersecting on said axis and defining four axial projections, the other jaw having on the axial side facing said one jaw two mutually perpendicular crossed pairs of spaced parallel-walled parallel grooves transverse to and intersecting at locations radially offset from said axis and defining one central and four radially offset axial projections interlocking with said first-mentioned four projections.

5. The combination of claim 4, in which the minimum spacing between adjacent walls of adjacent grooves of one of said pairs is at least substantially equal to the effective width of the correspondingly oriented groove in said one jaw.

6. In combination, a chuck jaw and a false jaw secured thereto on a common thrust axis, said jaws being similarly cylindrical about said axis in the vicinity of mutual interfit, one of said jaws having on the axial side adjacent the other jaw two mutually perpendicular crossed grooves of equal width transverse to and intersecting on said axis and defining four equal angularly spaced projections, the other jaw having on the axial side facing said one jaw two mutually perpendicular crossed pairs of equally spaced parallel grooves of equal width transverse to and intersecting at locations radially offset from said axis and defining one central and four equal radially offset projections interlocking with said first-mentioned four projections.

7. The combination of claim 6, in which the minimum spacing between adjacent walls of said pairs is at least substantially equal to the effective width of the correspondingly oriented groove in said one jaw.

8. The combination of claim 6, in which the minimum spacing between outer walls of said pairs is at least substantially equal to the diameter of said cylindrical parts times cos 45°.

9. The combination of claim 6, in which the maximum width of the grooves in said one jaw is less than the diameter of said cylindrical parts times cos 45°.

References Cited in the file of this patent

UNITED STATES PATENTS

| | | |
|---|---|---|
| 815,877 | Taylor | Mar. 20, 1906 |
| 1,816,655 | Ragan | July 28, 1931 |
| 1,906,424 | Schurr | May 2, 1933 |
| 2,122,360 | Sloan et al. | June 28, 1938 |

FOREIGN PATENTS

| | | |
|---|---|---|
| 844,237 | Germany | July 17, 1952 |